(12) United States Patent
Park

(10) Patent No.: US 9,296,367 B2
(45) Date of Patent: Mar. 29, 2016

(54) BRAKE APPARATUS FOR ELECTRIC CORNER MODULE

(71) Applicant: MANDO CORPORATION, Pyeongtaek-si, Gyeonggi-do (KR)

(72) Inventor: Seung Young Park, Yongin-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 169 days.

(21) Appl. No.: 14/307,942

(22) Filed: Jun. 18, 2014

(65) Prior Publication Data

US 2015/0101894 A1    Apr. 16, 2015

(30) Foreign Application Priority Data

Oct. 16, 2013  (KR) .................. 10-2013-0123586

(51) Int. Cl.
*B60T 1/06* (2006.01)
*B60T 13/74* (2006.01)
*F16H 57/10* (2006.01)

(52) U.S. Cl.
CPC ............... *B60T 1/062* (2013.01); *B60T 13/741* (2013.01); *F16H 57/10* (2013.01)

(58) Field of Classification Search
CPC ....... B60T 1/062; B60T 13/741; F16H 57/10; F16D 2121/24; F16D 2125/40
See application file for complete search history.

(56) References Cited

U.S. PATENT DOCUMENTS

| 2005/0077782 | A1* | 4/2005 | Horiuchi | B60T 13/741 303/20 |
| 2007/0062769 | A1* | 3/2007 | Noh | B60T 13/588 188/265 |
| 2013/0126279 | A1* | 5/2013 | Yu | B60T 13/746 188/72.1 |

FOREIGN PATENT DOCUMENTS

JP           3515628 B2    4/2004

* cited by examiner

*Primary Examiner* — Xuan Lan Nguyen
(74) *Attorney, Agent, or Firm* — McDermott Will & Emery LLP

(57) ABSTRACT

Provided is a brake apparatus for an electric corner module (ECM) including: a housing; a shaft, of which both ends are accommodated in accommodation portions of the housing; a planet gear connected to the shafts; and a driving unit that transmits power to the shaft, moves the planet gear in an axial direction and induces friction between the housing and the planet gear. That is, in a brake apparatus for an ECM, a planet gear is moved in an axial direction using a driving unit so as to induce friction between a housing and the planet gear and thus confinement forces of the planet gear are generated so that a brake function can be implemented by blocking power transmission using a decelerator and the weight of a wheel can be reduced and the size of a power transmission system can be reduced and optimization of packaging can be implemented.

6 Claims, 3 Drawing Sheets

100 : [100A, 100B]
400 : [410, 420]

BRAKE APPARATUS FOR ELECTRIC CORNER MODULE

RELATED APPLICATIONS

This application claims the benefit of Korean Application No. 10-2013-0123586, filed on Oct. 16, 2013, the disclosure of which is incorporated by reference herein.

BACKGROUND

1. Field of the Invention

The present invention relates to a brake apparatus for an electric corner module (ECM) in which planet gears are moved in an axial direction using a driving unit so as to induce friction between a housing and the planet gears and thus confinement forces of the planet gears are generated so that a brake function can be implemented by blocking power transmission using a decelerator.

2. Discussion of Related Art

In general, in electric vehicles or hybrid vehicles, unlike internal-combustion engine vehicles, a motor is mounted in a wheel for power transmission and driving of the motor is used as a power source.

There is an electric corner module (ECM) or an in-wheel motor as a power transmission system having the structure.

Also, the power transmission system described above uses a decelerator so as to obtain a large driving force.

The decelerator is configured in such a way that a linear gear is mounted on a wheel shaft and a ring gear is disposed at a housing and a planet gear carrier including a plurality of planet gears that engage with the linear gear and the ring gear is installed at a wheel hub and if the ring gear is fixed and the linear gear is driven, the planet gear carrier is decelerated.

That is, if an electric power source is applied to a stator of the motor, a rotor is driven and power is transmitted to the rotor, the linear gear is rotated. In this case, the planet gears are rotated along an inner surface of the ring gear, and the planet gear carrier drives the wheel so that the wheel is decelerated and a large driving force can be obtained.

However, a power transmission system having one of structures of the conventional in-wheel motor as well as the conventional ECM described above is configured so that general brake apparatuses, such as a motor brake, a caliper, and a drum brake, are installed in the wheel.

Thus, since the power transmission system and general brake apparatuses need to be disposed together in the wheel, the size of the power transmission system is limited.

Also, when a separate caliper or drum is introduced, part of the performance of the motor or the decelerator may be lowered, or brake performance may be degraded. In addition, the size of the wheel is increased, which causes an increase in the size of the power transmission system such that it is difficult to implement optimization of packaging.

Furthermore, an increase in the size of the wheel and the power transmission system may cause space efficiency of a vehicle to be lowered and a bad influence on improvement in fuel efficiency may be provided.

PRIOR-ART DOCUMENT

Patent Document (Patent document 1) Japanese Patent Publication No. 3515628 (published on Jan. 23, 2004)

SUMMARY OF THE INVENTION

The present invention is directed to a brake apparatus for an electric corner module (ECM) in which planet gears are moved in an axial direction using a driving unit so as to induce friction between a housing and the planet gears and thus confinement forces of the planet gears are generated so that a brake function can be implemented by blocking power transmission using a decelerator and weights of a wheel and a power transmission system can be reduced and optimization of packaging can be implemented.

The present invention is also directed to a brake apparatus for an ECM in which a hydraulic pressure, a pneumatic pressure, or an actuator, such as a motor, can be configured as a driving unit so as to supply a power source for moving planet gears in an axial direction and a simple structure can be provided and stable power transmission can be performed.

According to an aspect of the present invention, there is provided a brake apparatus for an electric corner module (ECM), the brake apparatus including: a housing having accommodation portions; a shaft, of which both ends are accommodated in the accommodation portions of the housing; a planet gear connected to the shaft; and a driving unit that transmits power to the shaft, moves the planet gear in an axial direction and induces friction between the housing and the planet gear.

The brake apparatus may further include an elastic member that is embedded in the accommodation portions of the housing and supports one end or both ends of the shaft.

The driving unit may include: a flow path formed to communicate with the accommodation portions of the housing; and a driving pump that supplies a working fluid through the flow path and pressurizes the shaft in the axial direction so as to induce an axial motion of the planet gear.

The driving unit may include: a driving motor; and a motion conversion portion that is connected to one end of the shaft and converts a rotation motion of the driving motor into a linear motion so as to induce an axial motion of the shaft.

The brake apparatus may further include a sealing member that is mounted on the shaft and contacts wall surfaces of the accommodation portions of the housing.

The brake apparatus may further include a frictional pad disposed on a contact surface of the housing and the planet gear.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Hereinafter, a brake apparatus for an ECM according to an embodiment of the present invention will be described in greater detail with reference to the accompanying drawings.

Figure 1:
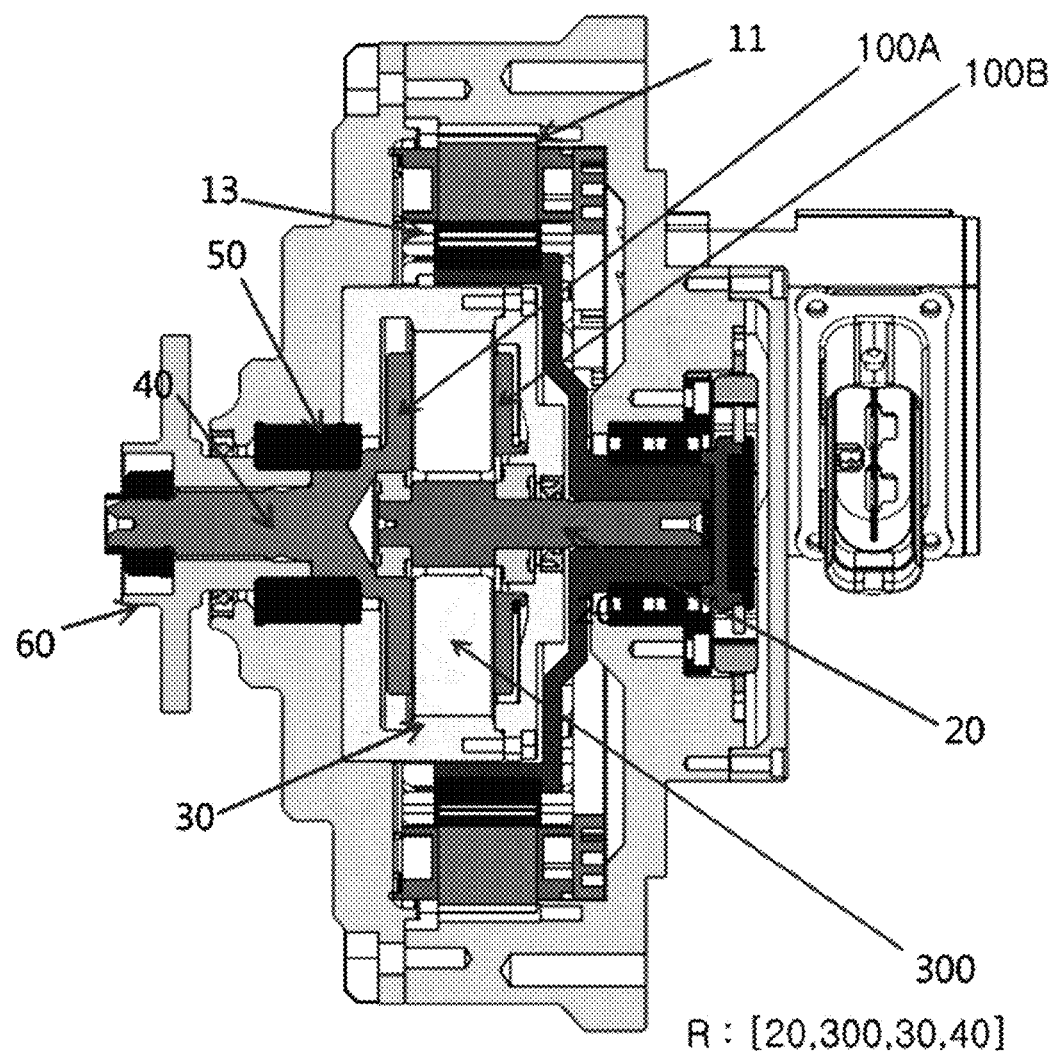
FIG. 1 is a conceptual view illustrating a power transmission system having a brake apparatus for an electric corner module (ECM) according to an embodiment of the present invention.
Figure 2:
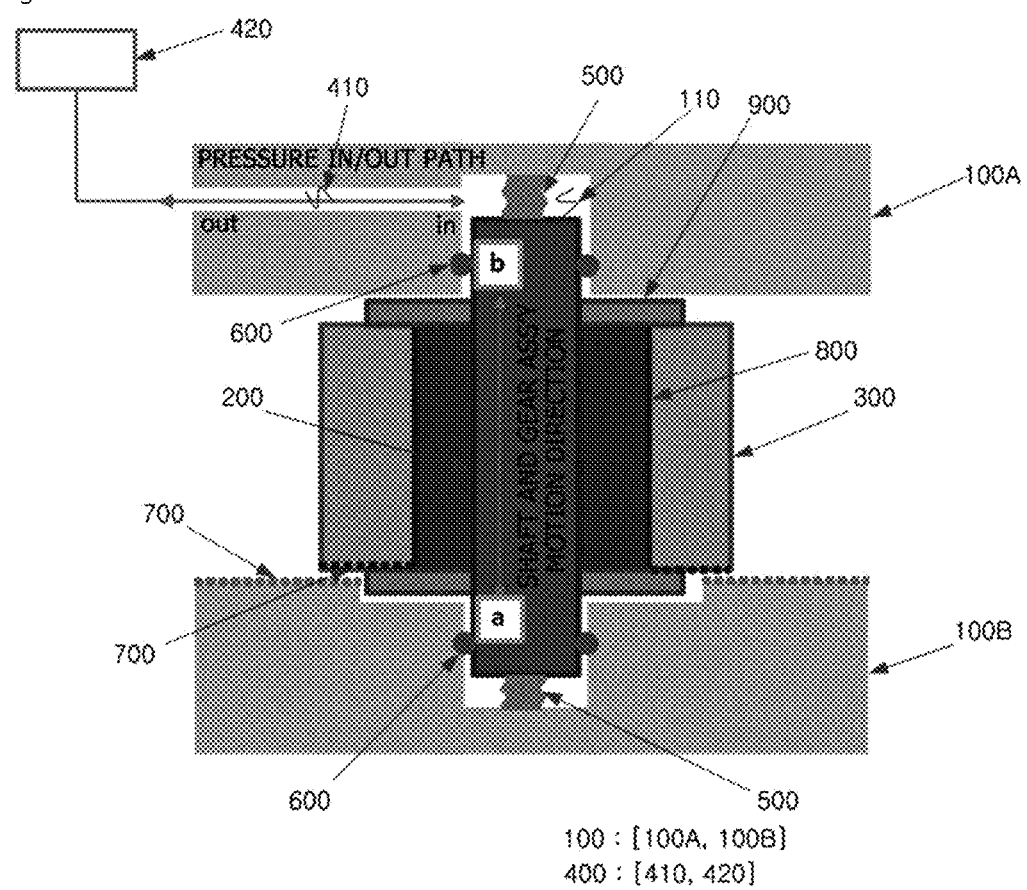
FIG. 2 is a conceptual view illustrating a brake apparatus for an ECM according to a first embodiment of the present invention.
Figure 3:
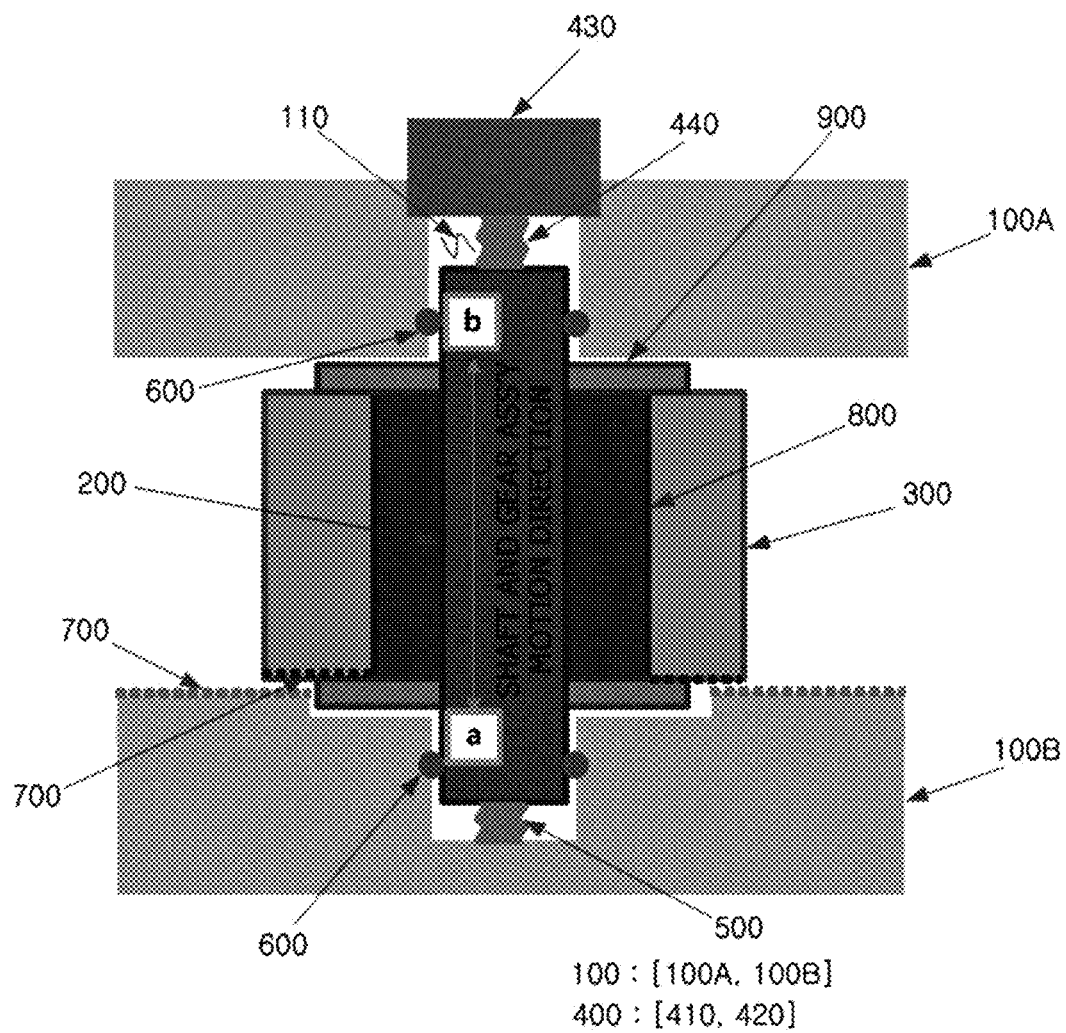
FIG. 3 is a conceptual view illustrating a brake apparatus for an ECM according to a second embodiment of the present invention.

As illustrated in FIGS. 1 through 3, a brake apparatus for an electric corner module (ECM) according to the present invention includes a housing 100 having accommodation portions 110, shafts 200, of which both ends are accommodated in the accommodation portions 110 of the housing 100, planet gears 300 connected to the shafts 200, and a driving unit 400 that transmits power to the shafts 200 so as to move the planet gears 300 in an axial direction and that induces friction between the housing 100 and the planet gears 300.

First, a power transmission system for an ECM according to the present invention illustrated in FIG. 1 includes a motor 10 for transmitting power and a decelerator R for transmitting power generated by the motor 10 to a wheel 60.

The decelerator R includes a linear gear 20 connected to a rotor 13 of the motor 10, a ring gear 30 mounted on a casing, a plurality of planet gears 300 disposed to engage with the linear gear 20 and the ring gear 30, and an output shaft 40 to which the plurality of planet gears 300 are connected.

The output shaft 40 is installed at a wheel hub 50.

In the power transmission system for the ECM having the above configuration, an electric power source is applied to a stator 11 of the motor 10 so that the rotor 13 is driven, and the linear gear 20 is rotated by the rotor 13, and the plurality of planet gears 300 are rotated by the linear gear 20.

Also, if the ring gear 30 is rotated by the planet gears 300, the output shaft 40 is rotated. In this case, power is transmitted to the wheel hub 50 so as to drive the wheel 60 so that power can be transmitted to a vehicle.

In this case, the linear gear 20 of the decelerator R is rotated. In this case, the planet gears 300 are rotated along an inner surface of the ring gear 30, and the wheel 60 is driven and obtain a large driving force.

In particular, as illustrated in FIGS. 2 and 3, in the brake apparatus for the ECM according to the present invention, the housing 100 is connected to inner ends of the output shaft 40 of the decelerator R and is disposed in the ring gear 30.

The housing 100 includes a front housing 100A and a rear housing 100B. A plurality of accommodation portions 110 are disposed at corresponding positions of inner surfaces of the front housing 100A and the rear housing 100B.

Furthermore, both ends of each of the shafts 200 are accommodated in accommodation portions 110 disposed at the corresponding positions among accommodation portions 110 of each housing 100.

Bearings 800 are mounted on the shafts 200, and the plurality of planet gears 300 are mounted on outer sides of the bearings 800.

Support members 900, such as C-rings, are mounted on front and rear sides of the shafts 200 so as to prevent the bearings 800 and the planet gears 300 from escaping from the shafts 200 by supporting outer surfaces of the bearings 800 and the planet gears 300.

In the brake apparatus for the ECM having the above configuration, if the linear gear 20 is rotated by driving of the motor 10, the planet gears 300 are driven along the inner surface of the ring gear 30, and the output shaft 40 drives the wheel hub 50 and transmits large power to the wheel 60.

In this case, in brake of the conventional electric vehicle or hybrid vehicle, the general brake apparatuses, such as a motor brake, a caliper, and a drum brake, as already mentioned in Discussion of Related Art is required.

However, endeavors for reducing the size of a power transmission system relating to an in-wheel motor as well as an ECM have been recently promoted as endeavors for packaging optimization.

When the general brake apparatuses are introduced like in the related art, a power transmission system should be installed in a wheel. Thus, there are many limitations in the size of the power transmission system, and it is very difficult to configure a brake apparatus.

Thus, when the general brake apparatuses are used, it is difficult to perform optimization of packaging, and the weight or size of the wheel is increased, and the weight or size of the power transmission system is increased.

This causes space efficiency of the vehicle to be lowered and has a bad influence on improvement in fuel efficiency.

Also, when the general brake apparatuses are additionally mounted like in the related art, part of the performance of a motor or a decelerator may be lowered, and brake performance may be degraded.

Thus, according to the present invention, in order to solve the conventional problems described above, brake performance is given to the decelerator R so that sizes of the wheel 60 and the power transmission system can be reduced and thus packing optimization can be implemented.

To this end, in the brake apparatus for the ECM according to the present invention, the planet gears 300 are moved in an axial direction and are confined due to frictional resistance when the planet gears 300 and the rear housing 100B (or the front housing 100A) contact each other so that the brake performance can be implemented.

First, the driving unit 400 is disposed to move the planet gears 300 in the axial direction.

The driving unit 400 moves the shafts 200 in one direction by using a hydraulic pressure, a pneumatic pressure or a driving motor 430 as a power source.

As illustrated in FIG. 2, when a hydraulic or pneumatic pressure (hereinafter referred to as a 'working fluid') is used as the power source, a flow path 410 is formed to communicate with the accommodation portions 110 disposed at the front housing 100A (or the rear housing 100B), and a driving pump 420 is provided so as to supply the working fluid onto the flow path 410.

Thus, if the driving pump 420 operates by signals for braking applied thereto, the working fluid having a predetermined pressure is filled in the accommodation portions 110 through the flow path 410.

One end (front end) of each shaft 200 is pressurized by the pressure of the working fluid so that the shafts 200 are moved from a direction 'b' to a direction 'a.'

In this case, the planet gears 300 are moved in the axial direction, and the other end surfaces (or rear end surfaces) of the planet gears 300 come into contact with inner surfaces of the rear housing 100B, and the planet gears 300 are confined by resistance caused by contact surfaces of the planet gears 300 and the rear housing 100B so that power transmission is blocked and braking can be performed.

As illustrated in FIG. 3, when a driving force of the motor 10 is used as another embodiment of the driving unit 400, a driving motor 430 is mounted on the side of the accommodation portions 110 disposed at the front housing 100A (or the rear housing 100B).

A motion conversion portion 440 that may convert a rotation motion into a linear motion using the driving motor 430 is introduced. The motion conversion portion 440 is connected to the driving motor 430 and one end (front end) of the shaft 200.

Thus, if the driving motor 430 operates by brake signals applied thereto, the motion conversion portion 440 converts the rotation motion of the driving motor 430 into the linear motion.

In this case, the shafts 200 are moved from the direction 'a' to the direction 'b.'

Thus, the planet gears 300 are moved in the axial direction, and the other end surfaces (or rear end surfaces) of the planet gears 300 contact inner surfaces of the rear housing 100B, and the planet gears 300 are confined by resistance caused by a contact surface of the planet gears 300 and the rear housing 100B so that power transmission is blocked and braking can be performed.

In this case, the motion conversion portion 440 may have various structures for converting the rotation motion of the driving motor 430 into the linear motion.

For example, a driving shaft provided on the driving motor 430 is manufactured in the form of a screw, or the screw is connected to the driving shaft, and grooves or holes in which spirals are formed in the axial direction, are formed in the shafts 200, and when the driving motor 430 is driven by inserting screws into the grooves or holes, the screws are rotated and simultaneously, the shafts 200 are moved in a straight line by riding the screws.

In this case, a ball screw type having balls embedded therein may also be introduced so as to reduce friction between the screws and the spirals of the shafts 200.

Also, a device or an instrument that may convert a rotation motion into a linear motion may be introduced as the motion conversion portion 440 in addition to the above-described embodiment.

The brake apparatus for the ECM according to the present invention having the above configuration gives a brake function to the decelerator R itself so that the general brake apparatuses are not required to be additionally installed like in the related art.

Thus, the size or weight of the wheel 60 or the power transmission system can be reduced, and thus optimization of packaging can be implemented.

Furthermore, sealing members 600 each having an O-ring shape are mounted on both ends of the shaft 200 so that an air-tight state can be maintained by a contact with wall surfaces of the accommodation portions 110.

In particular, when the working fluid is used as the power source caused by the driving unit 400, introduction of the sealing members 600 is necessary so that the working fluid can be prevented from leaking and a predetermined pressure can be maintained when braking is performed.

In addition, frictional pads 700 may be attached onto frictional surfaces between the planet gears 300 and the rear housing 100B, so as to prevent abrasion of a material caused by friction between the planet gears 300 and the rear housing 100B and to reduce noise.

Furthermore, the frictional pads 700 may be formed of a material having a large frictional coefficient so that, when friction between the planet gears 300 and the rear housing 100B occurs, a frictional force can be increased. Also, the frictional pads 700 may be manufactured of a material that may reduce abrasion and noise caused by friction therebetween.

Also, elastic members 500 may be introduced so that, after the shafts 200 and the planet gears 300 are moved in the axial direction using the driving unit 400 and a brake function is performed, the shafts 200 and the planet gears 300 can be smoothly restored to their original states.

To this end, the elastic members 500 are embedded in the accommodation portions 110 of the housing 100, are connected to both end surfaces of the shaft 200 and show elasticity when the shaft 200 is moved from the direction 'a' to the direction 'b' so as to be restored to its original state, after the brake function is performed, so that the restoring operation of the shaft 200 can be smoothly performed.

However, as illustrated in FIG. 3, when the driving motor 430 is introduced as the driving unit 400, pressure conversion portions instead of the elastic members 500 may be disposed on the accommodation portions 110 at the front housing 100A in which the motion conversion portion 440 is disposed.

In this case, the restoring operation of the shaft 200 can be implemented using only one elastic member 500 disposed at the rear housing 100B.

The elastic member 500 may be manufactured of one of various materials that may show elasticity, such as a spring, rubber or elastomer.

As described above, in a brake apparatus for an electric corner module (ECM) according to the present invention, a brake function can be implemented by a decelerator itself without the necessity of additionally introducing general brake apparatuses so that weights of a wheel and a power transmission system can be reduced and optimization of packaging can be implemented.

In addition, through optimization of packaging, space efficiency of a vehicle can be improved, and fuel efficiency of the vehicle can be improved.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A brake apparatus for an electric corner module (ECM), the brake apparatus comprising:
   a housing 100 having accommodation portions 110;
   a shaft 200, of which both ends are accommodated in the accommodation portions 110 of the housing 100;
   a planet gear 300 connected to the shaft 200; and
   a driving unit 400 that transmits power to the shaft 200, moves the planet gear 300 in an axial direction and induces friction between the housing 100 and the planet gear 300.

2. The brake apparatus of claim 1, further comprising an elastic member 500 that is embedded in the accommodation portions 110 of the housing 100 and supports one end or both ends of the shaft 200.

3. The brake apparatus of claim 1, wherein the driving unit 400 comprises:
   a flow path 410 formed to communicate with the accommodation portions 110 of the housing 100; and
   a driving pump 420 that supplies a working fluid through the flow path 410 and pressurizes the shaft 200 in the axial direction so as to induce an axial motion of the planet gear 300.

4. The brake apparatus of claim 1, wherein the driving unit 400 comprises:
   a driving motor 430; and
   a motion conversion portion 440 that is connected to one end of the shaft 200 and converts a rotation motion of the driving motor 430 into a linear motion so as to induce an axial motion of the shaft 200.

5. The brake apparatus of claim 1, further comprising a sealing member 600 that is mounted on the shaft 200 and contacts wall surfaces of the accommodation portions 110 of the housing 100.

6. The brake apparatus of claim 1, further comprising a frictional pad 700 disposed on a contact surface of the housing 100 and the planet gear 300.

\* \* \* \* \*